United States Patent
Harless

(10) Patent No.: US 6,278,416 B1
(45) Date of Patent: Aug. 21, 2001

(54) SURFACE EDGE ENHANCEMENT FOR SPACE-DEPLOYABLE MESH ANTENNA

(75) Inventor: Richard I. Harless, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/441,651

(22) Filed: Nov. 18, 1999

(51) Int. Cl.$^7$ ..................................................... H01Q 15/20
(52) U.S. Cl. ........................ 343/915; 343/840; 343/881; 343/882
(58) Field of Search ........................ 343/840, 882, 343/897, 912, 915, 916, 881; H01Q 15/20

(56) References Cited

U.S. PATENT DOCUMENTS

| | | | |
|---|---|---|---|
| 4,498,087 | * 2/1985 | Imbiel et al. | 343/915 |
| 4,989,015 | * 1/1991 | Chang | 343/915 |
| 5,446,474 | * 8/1995 | Wade et al. | 343/915 |
| 5,635,946 | * 6/1997 | Francis | 343/915 |
| 5,680,145 | * 10/1997 | Thomson et al. | 343/915 |
| 5,920,294 | * 7/1999 | Allen | 343/912 |
| 5,990,851 | * 11/1999 | Henderson et al. | 343/915 |

FOREIGN PATENT DOCUMENTS

05014049  * 1/1993 (JP) .............................. H01Q/15/20

\* cited by examiner

*Primary Examiner*—Don Wong
*Assistant Examiner*—Shih-Chao Chan
(74) *Attorney, Agent, or Firm*—Allen, Dyer, Doppelt, Milbrath & Gilchrist, P.A.

(57) ABSTRACT

An architecture deploying an energy-directing mesh so as to conform with a prescribed surface includes a plurality of radially extending support structures. Cords extend between the support structures in a generally circumferential fashion, and have attachment locations for the energy-directing material offset from the support structures. Each of a plurality of outermost intercostal cords is retained in tension between the support structures and is configured to substantially conform to the perimeter of the prescribed surface. Flexible intercostal compression reactor members are arranged to be placed in tension in a generally arcuate shape between adjacent support structures. Flexible radial compression members are placed in compression between the intercostal compression reactor members and the outermost intercostal cords, so that the outermost cords substantially conform with the perimeter of the prescribed surface. The outermost intercostal cord is supplemented by at least one, and preferably a plurality of, additional, auxiliary cords installed between each pair of support structures. These plural cords are attached to intercostal and radial compression members in a manner that fills in the scallop-shaped gaps of the conventional architecture with an auxiliary mesh attachment structure for conforming the perimeter of the mesh surface with its intended geometrical shape. The combination of these additional intercostal cord sets and their associated radial compression members provides for a more accurate mesh attachment geometry and improved stability.

20 Claims, 2 Drawing Sheets

SURFACE EDGE ENHANCEMENT FOR SPACE-DEPLOYABLE MESH ANTENNA

FIELD OF THE INVENTION

The present invention relates to support structures, such as but not limited to those for deploying energy-directing surfaces (e.g., radio wave or solar reflectors), in either terrestrial or space applications, and is particularly directed to a new and improved antenna mesh deployment architecture, that is compactly stowable, and deploys to a configuration that supports a mesh-configured reflector surface in substantial conformity with an intended surface of revolution, having minimized recessed (e.g., 'scalloped') edges at its periphery.

BACKGROUND OF THE INVENTION

The use of large reflector structures for satellite communication networks is becoming more widespread as demand for mobile communications increases. As the aperture size or number of reflectors per space-deployed communication site increases, the availability of lightweight, compactly packaged antenna structures is a key element in industry growth. A non-limiting example of an umbrella type and folded rib mesh reflector include the Tracking Data Relay System (TDRS) mesh reflector antenna system, deployed by the National Aeronautics and Space Administration (NASA). In its deployed state or condition, the metallic mesh reflector structure of the TDRS system measures 4.8 meters in diameter; yet, when folded, it is readily stowed in a cylindrical volume approximately one meter in diameter and three meters in length. Each satellite in the deployed TDRS constellation employs two such antennae.

In addition to the TDRS antenna system, there are other communications systems, such as the Asian Cellular Satellite (ACeS), that employ two mesh reflectors, each having an aperture size of twelve meters. Each of these reflectors, with folding ribs, is sized to fit within a cylindrical volume approximately one meter diameter and four and one-half meters in length. By folding the ribs, the same TDRS-configured volume, moderately lengthened, can package a reflector that is more than twice the TDRS size.

There are other reflector designs in which rigid elements are oriented in either a radial direction from the reflector center or a circumferential direction at the reflector periphery, and may employ foldable rigid elements to improve packaging. Non-limiting examples of such prior art antenna structures include the following U.S. Pat. Nos.: 5,787,671; 5,635,946; 5,680,145; 5,574,472; 5,451,975; 5,446,474; 5,198,832; 5,104,211; and 4,989,015;

The basic architecture of such 'umbrella' mesh reflector designs is diagrammatically shown in the perspective view of FIG. 1, as comprising an arrangement of radially extending ribs 10, and associated sets of circumferentially extending, mesh support cords 20 cross-connected between the ribs. When deployed from its stowed condition, this structure supports a generally mesh-configured material that serves as the intended reflective (e.g., electrically conductive, RF reflective) surface 30 of the antenna.

As shown in greater detail in the side view of FIG. 2, each set of circumferential cords 20 is organized into pairs, comprised of a front cord 21 and a rear cord 23, that are joined to one another via multiple tie cords 25 therebetween. Opposite ends of the front and rear cords 21, 23 are respectively attached to a front tie 12, and rigid rear stand-offs 14, supported by and extending generally orthogonally from the ribs 10, so that each cord set 20 is placed in tension by a pair of radial ribs 10 in a generally catenary configuration. The reflective mesh 30 is retained against the underside of the front cords 21 at their attachment points 16 with the tie cords 25. As a consequence, when the support structure is deployed, the cords sets 20 define a prescribed surface with which the attached tensioned mesh 30 conforms.

Radially outermost or 'intercostal' cord sets 20RO in FIG. 1, to which the outer peripheral edge 32 of the mesh is attached, are connected to stand-offs at distal ends 13 of the ribs 10. Because of the tensioning forces acting on the cord sets and on the mesh held thereby, each intercostal cord set 20RO follows a generally 'scalloped' arc 34, that is recessed radially inwardly, away from circular perimeter 35 of the surface of revolution with which the circumference of the deployed mesh surface 30 should ideally conform.

Because these scalloped arcs 34 leave (generally elliptically shaped) gap areas or openings 36 between the actual (scalloped) perimeter 34 of the deployed mesh surface 30 and the wider diameter generally circular perimeter 35 passing through the distal ends 13 of the ribs 10, the effective area of the reflective mesh 30 is generally limited to the radius to the interiormost scalloped edges of its intercostal cord sets, rather than the longer radial lengths of the ribs 10. In other words, due to the loss of reflective surface material in the scalloped gaps 36, the structure supporting the mesh surface must be increased in size (diameter). The increase is such that the resulting area of the actual mesh surface, exclusive of the scallops, is equal to the area of the desired reflector.

A first shortcoming of this conventional configuration is the increased payload associated with the larger rib lengths required to stow and deploy a given mesh surface area. Secondly, since the perimeter of the actually deployed surface is scalloped rather than circular, the additional mesh reflector material in the vicinity of the distal ends of the ribs introduces anomalies into the intended radiation profile of the antenna. Although the size of the gaps could be reduced by increasing the number of ribs (thereby placing more ribs closer together), such an approach would be self-defeating by the addition of substantial weight and volume.

SUMMARY OF THE INVENTION

In accordance with the present invention, the above-discussed deficiencies of conventional 'umbrella' configured mesh reflector structures are substantially mitigated by a support architecture, that effectively translates the terminus of the mesh to the diametric edge of the geometric surface actually required by the antenna, rather than at the interior recessed edges of a scalloped perimeter. For this purpose, the invention employs a gap-filling structure that supports a mesh-attachment, outermost intercostal cord set that substantially conforms with the intended (e.g., circular) perimeter geometry of the deployed mesh.

The outermost intercostal cord set is supplemented by at least one, and preferably a plurality of, additional, auxiliary intercostal cord sets installed between each pair of structural support members, herein referred to as 'ribs'. These plural intercostal cord sets are attached to intercostal and radial compression members in a manner that fills in the scallop-shaped gaps of the conventional architecture (FIG. 1), with an auxiliary mesh attachment structure for conforming the perimeter of the mesh surface with its intended geometrical shape (e.g., generally a circle). The combination of these additional intercostal cord sets and their associated intercostal and radial compression members provides for a more accurate mesh geometry and improved reflector surface stability.

A set of such gap-filling intercostal and radial compression members employed in one of the radial sectors of the multi-rib architecture contains a first, flexible intercostal compression reactor member and a plurality of second, generally radially extending, flexible compression members that are sized to fill the shape of the scalloped gap. Each of the compression members has a cross section that is reduced considerably relative to that of the radial ribs. Also, the compression members may made of the same or similar materials as the support structure, rib members.

A flexible intercostal compression reactor member is installed between stand-offs affixed to distal ends of adjacent ribs. Interior ends of the radial compression members terminate and are attached at spaced apart locations along the intercostal compression reactor member. Second, outer ends terminate at spaced apart locations of an outermost intercostal cord. In the deployed state, the outermost intercostal cord is placed in tension by its catenary support at the distal ends of the ribs, and by the outer ends of the radial compression members.

An intercostal compression reactor member is longer than the distance between the stand-offs at distal ends of the deployed ribs to which its opposite ends are connected, so that, in its deployed state, the intercostal compression reactor member is placed in tension and held by a rear cord in a generally arcuate shape. The tension in the intercostal compression reactor member imparts a force to the generally radially extending flexible compression members, that are supported between the intercostal compression reactor member and the outermost intercostal cord. Because of their stiffness, the force applied to the radial compression members is sufficient to load the outermost intercostal cord so that it conforms to the overall intended geometry of the periphery of the deployed mesh surface.

The differential lengths of the radial compression members (relatively longer in the central, wider portion of the filled-in gap and relatively shorter closer to the ribs) are such that, in their deployed state, their outer ends terminate at the intended (e.g., generally circular) perimeter of the reflector surface geometry. This provides a substantially increased number of relatively closely edge spaced attachment points for the mesh surface. Without these additional attachment points provided by the invention, the mesh reflector surface would be attachable only to a scallop shaped cord set supported at its opposite ends by the widely separated distal ends of the support structure ribs, as described above with reference to the conventional structure of FIG. 1.

The radial compression members effectively provide the attachment functionality of the ribs, but without the substantial mass associated with these larger components. This enables the invention to offer a substantially increased number of and relatively closely spaced perimeter attachment points within the filled-in gap subtended by the outermost intercostal cord, when placed in tension by its catenary support at the distal ends of the ribs and the radial compression members.

In addition to being placed in compression between the outermost intercostal cord set and the intercostal compression member, the radial compression members are attached to additional, auxiliary intercostal cord sets, distributed along the radial compression members between the outermost intercostal cord and an interiormost intercostal cord set attached to the intercostal compression reactor member. The auxiliary intercostal cord sets enable their mesh attachment points to readily conform with the intended three-dimensional geometry of the reflector surface.

DETAILED DESCRIPTION

Figure 3:
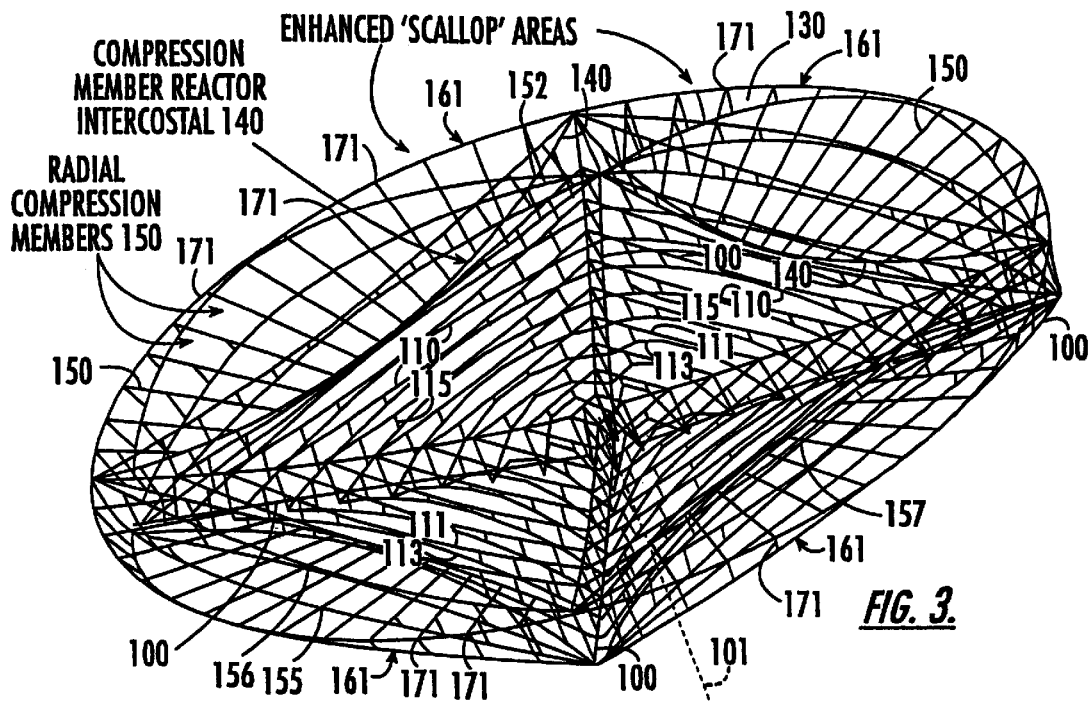
FIG. 3 is a diagrammatic perspective view of the edge-enhanced mesh reflector architecture of the present invention.

Attention is now directed to FIG. 3, which is a diagrammatic perspective view of the edge-enhanced mesh reflector architecture of the present invention. As pointed out above, the invention employs a modification of a conventional umbrella-configured architecture of the type shown in FIG. 1, but which is able to use fewer generally radial structural supports (i.e. ribs) to realize a reflector surface having minimized recessed (e.g., 'scalloped') edges at its periphery, and substantially conform with an intended reflective surface. In effect, the architecture of FIG. 3 serves to recover the reflective surface area lost by the scalloped recesses of the conventional structure.

Figure 1:
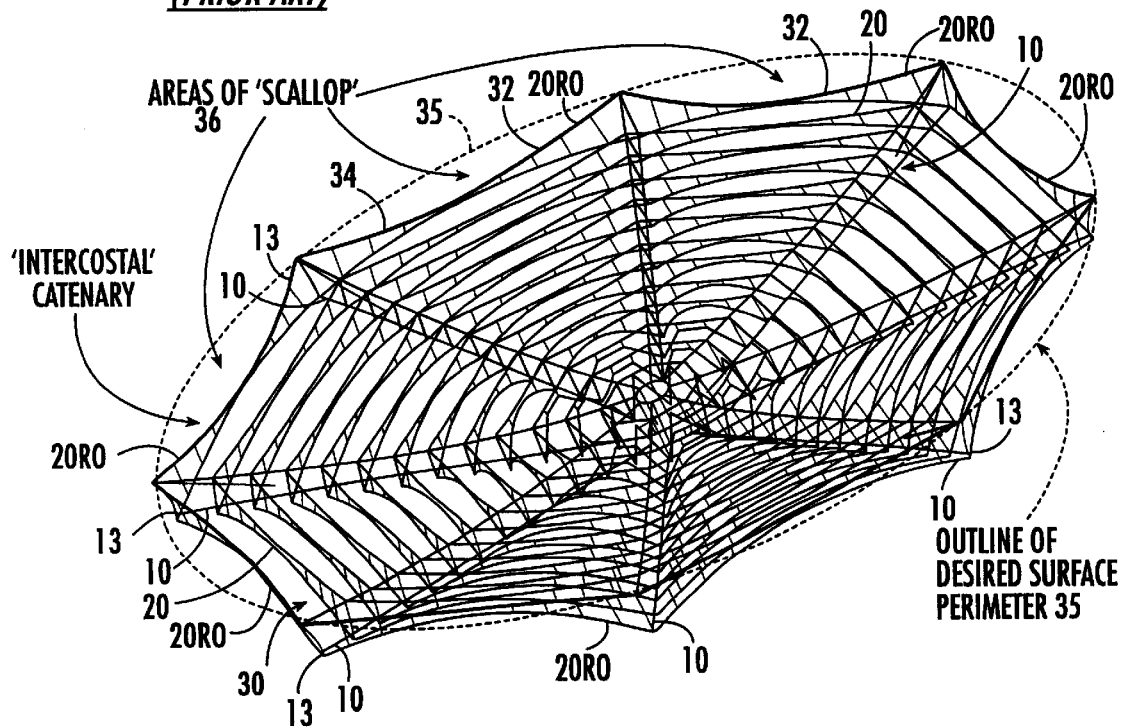
FIG. 1 is a diagrammatic perspective view of a conventional umbrella-configured mesh reflector.

Similar to the mesh reflector architecture of FIG. 1, the reduced structural member component design of the present invention shown in FIG. 3 contains a plurality of radially extending structural support ribs 100, as well as sets of circumferentially extending, mesh support cords 110 that are cross-connected between the ribs 100. For purposes of providing a non-limiting example, the architecture of FIG. 3 is shown as containing four radially extending structural support ribs which, in their deployed state, extend generally radially outwardly about a prescribed axis of revolution 101. It should be understood, however, that the invention is not limited to this type of rib structure or any particular number of ribs that may be so deployed. What is significant is the fact that the structure of the invention allows the number of structural support members to be substantially reduced relative to a conventional architecture and thereby provides a significant savings in weight and stowed volume of material. Like the conventional support structure of FIG. 1, when opened from its stowed condition, the structure of FIG. 3 will deploy a generally mesh-configured material into a parabolic surface so as to form the intended geometry of the energy-directing (e.g. RF-reflective) surface 130 of the antenna.

Figure 2:
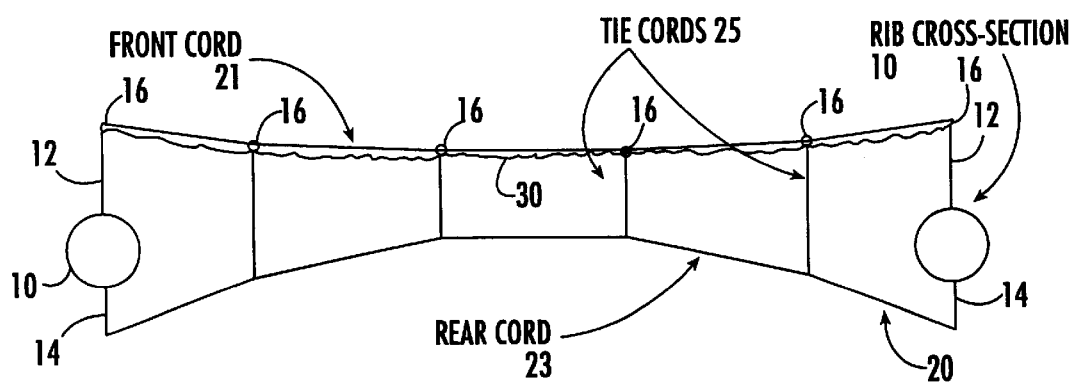
FIG. 2 is a side view of a set of circumferentially extending mesh support cords employed in the umbrella-configured mesh reflector of FIG. 1.

In the enhanced architecture of FIG. 3, each set of circumferential cords 110 is configured as shown in FIG. 2, referenced above, containing a front cord 111, a rear cord 113, and multiple tie cords 115 therebetween. Also, opposite ends of the front and rear cords 111, 113 are respectively attached to a front tie and rigid rear standoffs that are supported by and extend generally orthogonally from the ribs 100, so that each cord set 110 is placed in tension in a generally catenary fashion by its associated pair of radial ribs 100, that encompasses a prescribed sector of the deployed surface (e.g., generally a paraboloid).

As in the structure of FIG. 1, the reflective mesh surface 130 is retained against the underside of the front cords 111 at their attachment points with the tie cords 115. However, unlike the structure of FIG. 1, which terminates the perimeter of the mesh by means of a single circumferential interconnection of scalloped intercostal cord sets (attached to stand-offs at distal ends of the radial ribs), the modified architecture of FIG. 3 employs a gap filling structure that supports an outermost intercostal cord in a manner that substantially conforms with the intended (e.g., generally circular) perimeter geometry of the deployed mesh.

To this end, the outermost intercostal cord is supplemented by at least one, and preferably a plurality of, additional, auxiliary intercostal cord sets installed between each pair of ribs. These plural intercostal cord sets are attached to intercostal and radial compression members in a manner that serves to 'fill in' the gaps of the architecture of FIG. 1, with an auxiliary mesh attachment structure for conforming the perimeter of the mesh surface with its intended geometrical shape (e.g., generally a circle). Namely, the combination of these additional intercostal cord sets and their associated intercostal and radial compression members provides for a more accurate mesh geometry and improved reflector surface stability.

Figure 4:
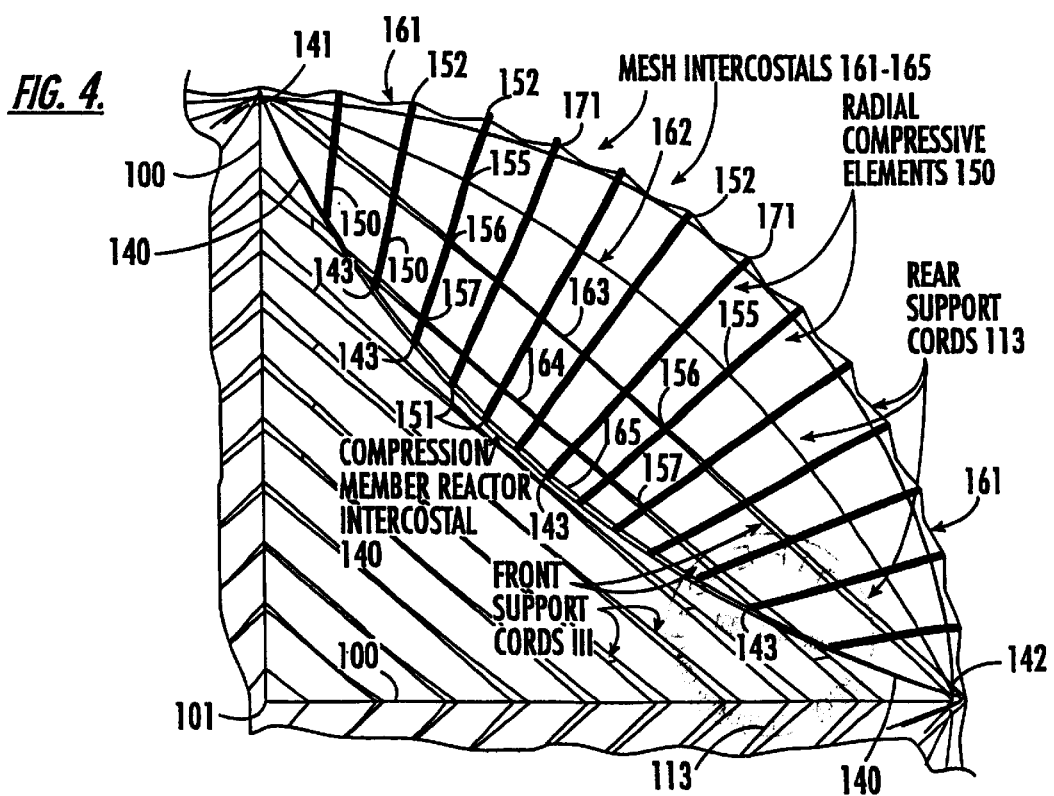
FIG. 4 is a diagrammatic plan view of a portion of the edge-enhanced mesh reflector architecture of FIG. 3.

A respective set of such gap-filling intercostal and radial compression members employed in one of the radial sectors (quadrants) of the four rib architecture of FIG. 3 is shown diagrammatically in the plan view of FIG. 4 as comprising a first, flexible intercostal compression reactor member 140, and a plurality of second, generally radially extending, flexible compression members 150 of differential lengths sized in accordance with the shape of the scalloped gap they serve to fill. Each of the compression members 140 and 150 may comprise a rod, tube or the like, of a cross section (e.g., on the order of one-eighth to one-quarter inch) that is reduced considerably relative to that of the radial support structure ribs 100 (which may have a cross section on the order of one to four or more inches). Also, the compression members 150 may made of the same or similar materials as the radial rib members of the reflector support structure, (e.g., graphite composites, quartz fibers in a suitable resin matrix (to eliminate undesirable RF effects such as passive intermodulation products) and the like).

The flexible intercostal compression reactor member 140 has opposite ends 141, 142 thereof connected to standoffs at distal ends of adjacent support structure members 110, that radially bound the sector of the antenna surface. First, interior ends 151 of the radial compression members 150 terminate and are attached to spaced apart locations 143 along the intercostal compression reactor member 140, while second, outer ends 152 thereof terminate at spaced apart locations 171 of a first, outermost intercostal cord 161. In the reflector's deployed state, the outermost intercostal cord 161 is placed in tension by its catenary support at the distal ends of the ribs 100, and by the outer ends 152 of the radial compression members 150.

As can be seen from the perspective view of FIG. 3 and more particularly in the plan view of FIG. 4, the length of an intercostal compression reactor member 140 is greater than the line-of-sight distance between the distal ends of the deployed ribs 100 to which its opposite ends 141, 142 are connected. As a result, in its deployed state, the intercostal compression reactor member 140 is placed in tension and held in a generally arcuate shape, similar to that of the scalloped shape followed by the outermost (intercostal) cord 200R of the structure of FIG. 1.

This tensioning of the intercostal compression reactor member 140, in turn, imparts the required force to compress the generally radially extending flexible compression members 150, as supported between the spaced apart locations 143 along intercostal compression reactor member 140 and the spaced apart locations 171 of the outermost intercostal cord set 161. Because of their flexibility, the radial compression members 150 readily bend to conform to the overall intended geometry of the deployed mesh surface 130.

The differential lengths of the radial compression members 150 (relatively longer in the central, wider portion of the filled-in gap and relatively shorter closer to the ribs 100) are such that, in their deployed state, their outer ends 152 terminate at the intended (e.g., generally circular) perimeter of the reflector surface geometry. This provides a substantially increased number of relatively closely edge spaced attachment points for the mesh surface 130.

Without these additional attachment points provided by the invention, the mesh reflector surface would be attachable only to a scallop shaped cord set supported at its opposite ends by the widely separated distal ends of the support structure ribs, as described above with reference to the conventional structure of FIG. 1. In effect, the radial compression members 150 provide the attachment functionality of the generally radial support structures (ribs), but without the substantial mass associated with these larger components.

Because the architecture of the invention provides for the installation of a relatively large number of radial compression members 150 between each radial support structure 100, what results is a mesh deployment structure having a substantially increased number of and relatively closely spaced perimeter attachment points. This enables the outermost intercostal cord 161, when placed in tension by its catenary support at the distal ends of the support structures 100 and the radial compression members 150, to effectively conform with the intended (generally circular) perimeter geometry of the reflector surface.

In addition to being placed in compression between the spaced apart locations 171 of the outermost intercostal cord 161, and spaced apart locations 143 along the intercostal compression reactor member 140, the compression members 150 are attached to additional, auxiliary cords, distributed along the lengths of the compression members 150 between the outermost intercostal cord 161 and an interiormost intercostal cord that is attached to and coincides with the intercostal compression reactor member 140. For purposes of providing a non-limiting illustrative example, a total of five auxiliary cords 161-165 are shown. It should be observed, however, that the invention is not limited to this or any particular number of such auxiliary cords.

As described above, as a result of the addition of the intercostal compression reactor member 140 and the radial compression members 150, the outermost intercostal cord 161 conforms with the intended outer (generally circular) perimeter of the reflector surface 130, while the interiormost, intercostal cord set 165 conforms with the shape and is attached to spaced apart locations 141 of the intercostal compression reactor member 140. The three remaining auxiliary cords 162, 163 and 164 are attached to respective locations 155, 156, 157 spaced apart along each of the radial compression members 150, that enable their mesh attachment points to readily conform with the intended three-dimensional (e.g., paraboloid) geometry of the reflector surface 130.

Because it fills in the scalloped gaps of a conventional mesh support structure of the type shown in FIG. 1, the enhancement architecture of the present invention is not only able to realize what is closer to a true three-dimensional surface of revolution, but it allows the use of a deeper, more lightly loaded, intercostal as represented by the compression member reactor intercostal, and thereby decreases loads in the structural members. It also reduces or eliminates RF effects (losses and antenna pattern asymmetry such as sidelobes) that would otherwise result from the scalloped edges of the architecture of FIG. 1. Moreover, as the lengths of the radial ribs in the architecture of FIGS. 3 and 4 need be no greater than the intended size of the deployed reflector, a given size antenna may be deployed with smaller and/or fewer structural members, thereby providing improved surface stowage volume.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. An architecture for deploying a surface comprising:
   a plurality of generally radially extending support structures and support cords connected between said structures, to which said surface is attached;
   a plurality of outermost intercostal cord sets supported by said support structures and coupled to said surface, a respective outermost intercostal cord being configured to substantially conform with a prescribed perimeter geometry of said surface in its deployed condition;
   a plurality of flexible intercostal compression reactor members arranged to be placed in tension between said support structures, a respective flexible intercostal compression reactor member having a length greater than the distance between adjacent support structures, so that, in its deployed condition, said respective intercostal compression reactor member is placed in tension and formed into a generally arcuate shape between said adjacent structures; and
   a plurality of flexible radial compression members, a respective flexible radial compression member having a first end coupled to a respective location along an intercostal compression reactor member, and a second end coupled to a location along an outermost intercostal cord set, so as to be placed in compression between said intercostal compression reactor member and said outermost intercostal cord, and thereby urge said outermost intercostal cord into conformance with said prescribed perimeter geometry of said surface in the deployed condition thereof.

2. The architecture according to claim 1, wherein said respective outermost intercostal cord is coupled to distal ends of adjacent support structures.

3. The architecture according to claim 1, further including a plurality of additional cord sets coupled to said support structures and to said flexible radial compression members.

4. The architecture according to claim 1, wherein said surface comprises an energy-directing mesh.

5. The architecture according to claim 1, wherein said flexible intercostal compression reactor members are coupled to distal ends of said support structures.

6. The architecture according to claim 1, wherein plural flexible radial compression members are installed between spaced apart locations along a respective intercostal compression reactor member and spaced apart locations along a respective outermost intercostal cord.

7. The architecture according to claim 6, wherein said radially extending flexible compression members, as installed between spaced apart locations along said respective intercostal compression reactor member and along said respective outermost intercostal cord are configured to be flexed into a shape that generally conforms with the geometry of the deployed surface.

8. The architecture according to claim 7, further including a plurality of auxiliary intercostal cords coupled to said support structures and to said flexible radial compression members.

9. The architecture according to claim 1, wherein said support cords and said intercostal cords are retained in tension between said support structures in a catenary fashion.

10. A structure for deploying an energy-directing material that conforms with a surface having a generally continuous perimeter comprising:
    a plurality of generally radially deployable support structures, and an arrangement of tensioned support cords supported in a catenary between said support structures in a generally circumferential fashion, and having a plurality of attachment locations for said energy-directing material, said arrangement of tensioned support cords including intercostal support cords supported between said support structures in a manner that creates gaps with said generally continuous perimeter of said surface; and
    an auxiliary gap filling structure supported by said support structures and having plural attachment locations for said energy-directing material, and being configured to provide additional attachment locations for said energy-directing material that extend into said gaps from said intercostal support cords so as to substantially conform with said continuous perimeter of said surface.

11. The structure according to claim 10, wherein said auxiliary gap filling structure includes:
    a plurality of outermost intercostal cords supported by said support structures and having plural attachment locations for said energy-directing material, a respective outermost intercostal cord being configured to substantially conform with the perimeter of said prescribed surface;
    a plurality of flexible intercostal compression reactor members arranged to be placed in tension between said support structures, such that, in the deployed condition of said energy-directing material, a respective intercostal compression reactor member is placed in tension in a generally arcuate shape between adjacent support structures; and
    a plurality of flexible radial compression members having first ends thereof coupled to spaced apart locations along said intercostal compression reactor members, and ends coupled to spaced apart locations along said outermost intercostal cords, and placed in compression between said intercostal compression reactor members and said outermost intercostal cords, so that said outermost intercostal cords substantially conform with said perimeter of said surface.

12. The structure according to claim 11, further including a plurality of additional intercostal cords having attachment locations for said energy-directing material, being retained in tension between said support structures, and coupled to said flexible radial compression members.

13. The structure according to claim 11, wherein said outermost intercostal cords and said flexible intercostal compression reactor members are coupled to distal ends of said support structures.

14. The structure according to claim 11, wherein plural ones of said flexible radial compression members are installed between spaced apart locations along a respective intercostal compression reactor member and spaced apart locations along a respective outermost intercostal cord.

15. The structure according to claim 14, wherein said radially extending flexible compression members, as installed between spaced apart locations along said respective intercostal compression reactor member and along said respective outermost intercostal cord, are configured to be flexed into a shape that generally conforms with said prescribed surface.

16. A method of causing an energy-directing material to conform with a prescribed surface comprising the steps of:
   (a) forming a deployable structure by:
      (a1) providing a plurality of generally radially deployable support structures, and support cords extending between said support structures in a generally circumferential fashion, and having a plurality of attachment locations for said energy-directing material that are offset from said support structures,
      (a2) installing a plurality of outermost intercostal cord sets between said support structures, said outermost intercostal cord sets having attachment locations for said energy-directing material, a respective outermost intercostal cord being configured to substantially conform with the perimeter of said prescribed surface in the deployed condition of said energy-directing surface,
      (a3) installing a plurality of flexible intercostal compression reactor members arranged between said support structures, such that, in the deployed condition of said energy-directing material, a respective intercostal compression reactor member is placed in tension in a generally arcuate shape between adjacent support structures, and
      (a4) installing a plurality of flexible radial compression members between said intercostal compression reactor members and said outermost intercostal cords said flexible radial compression members being configured such that, when placed in compression between said intercostal compression reactor members and said outermost intercostal cords, said outermost intercostal cords are caused to substantially conform with said perimeter of said surface; and
   (b) deploying the deployable structure formed in step (a), such that said support cords and said outermost intercostal cords, and said intercostal compression reactor members are retained in tension, and said flexible radial compression members are retained in compression, and thereby urge the shape of said energy-directing material attached thereto to substantially conform with said surface.

17. The method according to claim 16, wherein step (a) further includes (a5) coupling a plurality of tensionable auxiliary intercostal cords, having attachment locations for said energy-directing material, to said support structures and to said flexible radial compression members, and wherein step (b) comprises deploying the deployable structure formed in step (a), such that said tensionable auxiliary intercostal cords are placed in tension between said support structures, and urge the shape of a portion of said energy-directing material attached thereto and adjacent to said outermost intercostal cords to substantially conform with a portion of said surface.

18. The method according to claim 16, wherein said outermost intercostal cords and said flexible intercostal compression reactor members are coupled to distal ends of said support structures.

19. The method according to claim 16, wherein step (a4) comprises installing plural ones of said flexible radial compression members between spaced apart locations along a respective intercostal compression reactor member and spaced apart locations along a respective outermost intercostal cord.

20. The method according to claim 19, wherein said radially extending flexible compression members installed in step (a4) are configured to be flexed in step (b) into a shape that generally conforms with a portion of said prescribed surface.

* * * * *